(12) United States Patent (10) Patent No.: US 8,867,548 B2
Ahn et al. (45) Date of Patent: Oct. 21, 2014

(54) METHOD AND USER EQUIPMENT FOR TRANSMITTING UPLINK CONTROL INFORMATION

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 13/636,603

(22) PCT Filed: Mar. 18, 2011

(86) PCT No.: PCT/KR2011/001892
§ 371 (c)(1),
(2), (4) Date: Sep. 21, 2012

(87) PCT Pub. No.: WO2011/118940
PCT Pub. Date: Sep. 29, 2011

(65) Prior Publication Data
US 2013/0010743 A1 Jan. 10, 2013

Related U.S. Application Data

(60) Provisional application No. 61/315,995, filed on Mar. 22, 2010.

(51) Int. Cl.
| | |
|---|---|
| *H04L 12/28* | (2006.01) |
| *H04L 1/18* | (2006.01) |
| *H04L 1/16* | (2006.01) |
| *H04L 5/00* | (2006.01) |
| *H04W 28/04* | (2009.01) |

(52) U.S. Cl.
CPC ............ *H04L 1/1621* (2013.01); *H04L 5/0007* (2013.01); *H04L 5/001* (2013.01); *H04L 1/1864* (2013.01); *H04W 28/04* (2013.01)
USPC ............................ 370/394; 370/280; 370/329

(58) Field of Classification Search
None
See application file for complete search history.

(56) References Cited

U.S. PATENT DOCUMENTS

| 8,477,868 | B2 * | 7/2013 | Han et al. | 375/267 |
| 2011/0126071 | A1 * | 5/2011 | Han et al. | 714/749 |
| 2013/0010743 | A1 * | 1/2013 | Ahn et al. | 370/329 |
| 2013/0170407 | A1 * | 7/2013 | Liang et al. | 370/280 |
| 2013/0223300 | A1 * | 8/2013 | Yang et al. | 370/280 |

OTHER PUBLICATIONS

Alcatel-Lucent Shanghai Bell et al., "Method for multiple ACK. NACK transmission on PUCCH", 3GPP TSG-RAN WG1 #60, R1-100917, Feb. 22-26, 2010, 5 pages provided.

(Continued)

*Primary Examiner* — Robert Wilson
(74) *Attorney, Agent, or Firm* — Birch, Stewart, Kolasch & Birch, LLP

(57) ABSTRACT

In the event ACK/NACK information on downlink data transmitted on one or more carriers must be transmitted on a PUCCH together with SR, user equipment of the present invention always modulates the ACK/NACK information to a first complex modulation symbol regardless of the number of the carriers when a specific carrier is ACK and the other carriers are NACKs, or the specific carrier is ACK and ACK/NACK bundled for other carriers is NACK. Also, the user equipment always modulates the ACK/NACK information to a second complex modulation symbol regardless of the number of the carriers when a specific carrier is NACK and the other carriers are NACKs, or the specific carrier is ACK and the ACK/NACK bundled for the other carriers is NAC. According to the present invention, regardless of the number of carriers needed for the user equipment, at least ACK/NACK information on the specific carrier can be exactly transmitted to a base station.

8 Claims, 14 Drawing Sheets

(56) References Cited

OTHER PUBLICATIONS

CATT, "Multi-channel Transmission for UL ACK/NACK in LTE-A", 3GPP TSG RAN WG1 meeting #58 bis, R1-094130, Oct. 12-16, 2009, 3 pages provided.

LG Electronics, "UL ACK/NACK Transmission in Carrier Aggregation" 3GPP TSG RAN WG1 #60, R1-101231, Feb. 22-26, 2010, 3 pages provided.

LG Electronics, "Uplink ACK/NACK transmission in LTE-Advanced", 3GPP TSG RAN WG1 #58bis, R1-094163, Oct. 12-16, 2009, 6 pages provided.

* cited by examiner

Single Component Carrier (e.g., LTE System)

METHOD AND USER EQUIPMENT FOR TRANSMITTING UPLINK CONTROL INFORMATION

CROSS REFERENCE TO RELATED APPLICATIONS

This application is the National Phase of PCT/KR2011/001892 filed on Mar. 18, 2011, which claims priority under 35 U.S.C. §119(e) to U.S. Provisional Application No. 61/315,995 filed on Mar. 22, 2010, all of which are hereby expressly incorporated by reference into the present application.

FIELD OF THE INVENTION

The present invention relates to a wireless communication system. Especially, the present invention relates to a method and apparatus for transmitting uplink control information.

BACKGROUND ART

Wireless communication systems are evolving extensively in order to provide diverse types of communication services, such as audio and video data, and so on. Generally, a mobile communication system corresponds to a multiple access system that shares available system resource (e.g., bandwidth, transmission power, and so on) so as to be capable of supporting communication between multiple users. Examples of the multiple access system include a CDMA (code division multiple access) system, a FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

DETAILED DESCRIPTION OF THE INVENTION

Technical Objects

An object of the present invention is to provide a method and apparatus for transmitting multiple uplink control information in a wireless communication system. More specifically, the present invention provides a method and apparatus for transmitting ACK/NACK, when ACK/NACK information is required to be transmitted along with other uplink control information in a subframe.

It is to be understood that objects to be achieved by the present invention are not limited to the aforementioned objects and other objects which are not mentioned will be apparent to those of ordinary skill in the art to which the present invention pertains from the following description.

Technical Solutions

According to an aspect of the present invention, a method of transmitting, by a user equipment, uplink control information in a wireless communication system is provided herein. The method for transmitting uplink control information comprises: receiving downlink data from a base station on a plurality of carriers; generating ACK/NACK (ACKnowegement/Negative ACK) information for the downlink data; modulating the ACK/NACK information to generate a complex-valued modulation symbol; and transmitting the complex-valued modulation symbol to the base station by using a PUCCH (Physical Uplink Control CHannel) resource, the PUCCH resource being used for a scheduling request, wherein the modulating the ACK/NACK information modulates the ACK/NACK information into a first complex-valued modulation symbol when an ACK/NACK for a specific carrier among the plurality of carriers corresponds to an ACK and when an ACK/NACK for each of the remaining carriers among the plurality of carriers corresponds to an NACK, and modulates the ACK/NACK information into a second complex-valued modulation symbol when an ACK/NACK for each of the plurality of carriers corresponds to an NACK.

According to another aspect of the present invention, a method of transmitting, by a user equipment, uplink control information in a wireless communication system is provided herein. The method for transmitting uplink control information comprises receiving downlink data from a base station on a plurality of carriers; generating ACK/NACK (ACKnowlegement/Negative ACK) information for the downlink data; modulating the ACK/NACK information to generate a complex-valued modulation symbol; and transmitting the complex-valued modulation symbol to the base station by using a PUCCH (Physical Uplink Control CHannel) resource, the PUCCH resource being used for a scheduling request, wherein the modulating the ACK/NACK information modulates the ACK/NACK information into a first complex-valued modulation symbol when an ACK/NACK for a specific carrier among the plurality of carriers corresponds to an ACK and when a bundled ACK/NACK for all the remaining carriers among the plurality of carriers corresponds to an NACK, and modulates the ACK/NACK information into a second complex-valued modulation symbol when the ACK/NACK for the specific carrier corresponds to an NACK and when the bundled ACK/NACK corresponds to an NACK.

According to another aspect of the present invention, a user equipment of transmitting uplink control information in a wireless communication system is provided herein. The user equipment comprises a receiver configured to receive downlink data from a base station on a plurality of carriers; a transmitter configured to transmit an uplink signal to the base station; and a processor configured to control the receiver and the transmitter, wherein the processor is configured to generate ACK/NACK (ACKnowlegement/Negative ACK) information for the downlink data, wherein the processor is configured to control the transmitter so that the ACK/NACK information is modulated to a first complex-valued modulation symbol when an ACK/NACK a specific carrier among the plurality of carriers corresponds to an ACK and when an ACK/NACK for each of the remaining carriers among the plurality of carriers corresponds to an NACK, and control the transmitter so that the ACK/NACK information is modulated to a second complex-valued modulation symbol when an ACK/NACK for each of the plurality of carriers corresponds to an NACK, and wherein the processor is configured to control the transmitter to transmit the first complex-valued modulation symbol and the second complex-valued modulation symbol to the base station by using a PUCCH (Physical Uplink Control CHannel) resource, the PUCCH resource being used for a scheduling request.

According to yet another aspect of the present invention, a user equipment of transmitting uplink control information in a wireless communication system is provided herein. The user equipment comprises a receiver configured to receive downlink data from a base station on a plurality of carriers; a transmitter configured to transmit an uplink signal to the base station; and a processor configured to control the receiver and the transmitter, wherein the processor is configured to generate ACK/NACK (ACKnowlegement/Negative ACK) information for the downlink data; wherein the processor is configured to control the transmitter so that the ACK/NACK information is modulated to a first complex-valued modulation symbol when an ACK/NACK for a specific carrier among the plurality of carriers corresponds to an ACK and when a bundled ACK/NACK for all the remaining carriers corresponds to an NACK, and control the transmitter so that the ACK/NACK information is modulated to a second complex-valued modulation symbol when the specific carrier corresponds to an NACK and when the bundled ACK/NACK corresponds to an NACK, and wherein the processor is configured to control the transmitter to transmit the first complex-valued modulation symbol and the second complex-valued modulation symbol to the base station by using a PUCCH (Physical Uplink Control CHannel) resource, the PUCCH resource being used for a scheduling request.

According to each aspect of the present invention, the specific carrier may correspond to a primary carrier.

According to each aspect of the present invention, the first complex-valued modulation symbol may be identical to a complex-valued modulation symbol of an ACK information for downlink data being received on a single carrier, and the second complex-valued modulation symbol may be identical to a complex-valued modulation symbol of a NACK information for downlink data being received on the single carrier.

According to each aspect of the present invention, the first complex-valued modulation symbol may correspond to a modulation symbol 1, and the second complex-valued modulation symbol may correspond to a modulation symbol −1.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

According to the exemplary embodiments of the present invention, the present invention is advantageous in that an ACK/NACK signal can be efficiently transmitted in a multiple carrier system.

Additionally, according to the exemplary embodiments of the present invention, the present invention is advantageous in that an ACK/NACK for a specific carrier can be accurately transmitted to a base station from a user equipment.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE PRESENT INVENTION

Figure 1:
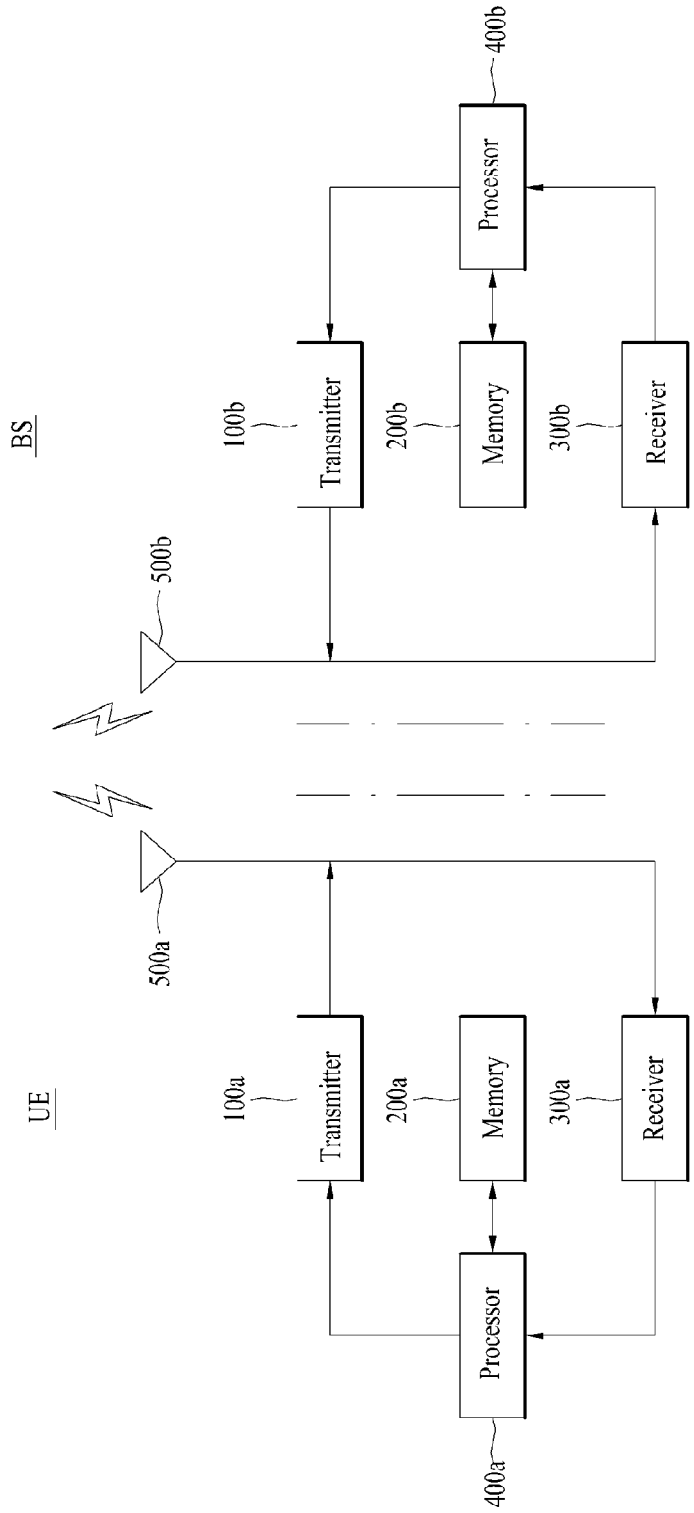
FIG. 1 is a block diagram of a user equipment (UE) and a base station (BS) for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatuses and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802.20, Evolved-UTRA (E-UTRA) etc. UTRA is a part of Universal Mobile Telecommunication System (UMTS). 3rd Generation Partnership Project (3GPP) Long Term Evolution (LTE) is a part of Evolved-UMTS (E-UMTS) using E-UTRA. 3GPP LTE employs OFDMA for downlink and employs SC-FDMA for uplink. LTE-Advanced (LTE-A) is an evolution of 3GPP LTE. For clarity, this application focuses on the 3GPP LTE/LTE-A. However, technical features of the present invention are not limited thereto. For example, although the following description will be made based on a mobile communication system corresponding to an 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a Base Station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a BS means a fixed station that performs communication with a UE and/or another BS, and exchanges various kinds of data and control information with the UE and another BS. The BS may be referred to as another terminology such as an evolved-Node B (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or transmission rank is the number of layers multiplexed/allocated to an OFDM symbol or data RE.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of resource elements (REs) carrying Downlink Control Information (DCI), a set of REs carrying Control Format Indicator (CFI), a set of REs carrying downlink ACK/NACK (ACKnowledgement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/ PUCCH/PUSCH/PRACH may be called PDCCH/PCFICH/ PHICH/PDSCH/PUCCH/PUSCH/PRACH RE or PDCCH/ PCFICH/PHICH/PDSCH/PUCCH/PUSCH/PRACH resource.

Therefore, in the present invention, PUCCH/PUSCH/ PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Meanwhile, in the description of the present invention, the process of mapping the ACK/NACK information to a specific constellation point will be used in the same meaning as a process of mapping the ACK/NACK information to a specific complex-valued modulation symbol. Additionally, in the description of the present invention, the process of mapping the ACK/NACK information to a specific complex-valued modulation symbol will be used in the same meaning as a process modulating the ACK/NACK information to a specific complex-valued modulation symbol.

FIG. 1 is a block diagram of a user equipment (UE) and a base station (BS) for implementing the present invention.

The UE serves as a transmitting apparatus on the uplink and as a receiving apparatus on the downlink. In contrast, the BS may serve as a receiving apparatus on the uplink and as a transmitting apparatus on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port cannot be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
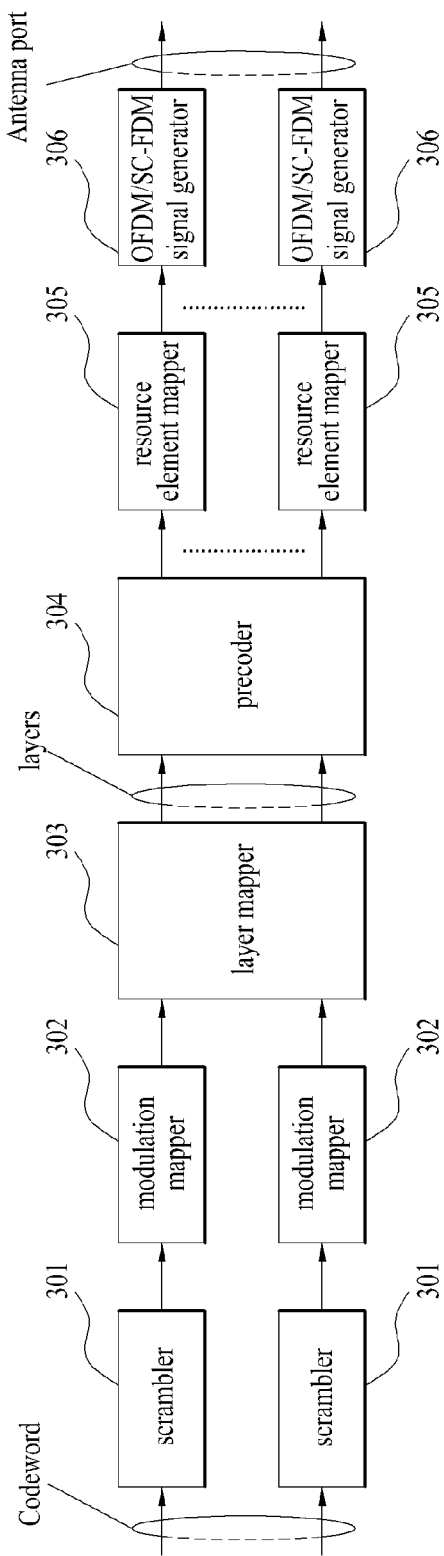
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to users.

The OFDM/SC-FDM signal generators 306 modulate the complex-valued modulation symbols for the respective antenna ports, that is, the antenna-specific symbols through OFDM or SC-FDM modulation, thereby producing a complex-valued time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex-valued modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is downconverted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive SC-FDM signals, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 1 and 2 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 1 and 2 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

Figure 3:
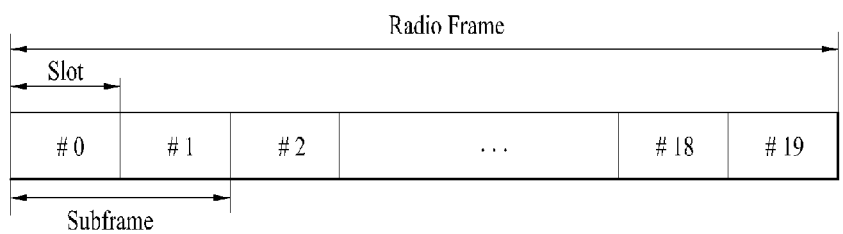
FIG. 3 illustrates an exemplary structure of a radio frame in a wireless communication system.

FIG. 3 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 3, a 3GPP LTE/LTE-A radio frame is 10 ms (307,200 $T_s$) in duration. The radio subframe is divided into 10 equally-sized subframes, each subframe being 1 ms long. $T_s$ represents a sampling time and is given as $T_s=1/(2048\times15$ kHz$)$. Each subframe is further divided into two slots, each of 0.5 ms in duration. 20 slots are sequentially numbered from 0 to 19. A time interval in which one subframe is transmitted is defined as a Transmission Time Interval (TTI).

Figure 4:
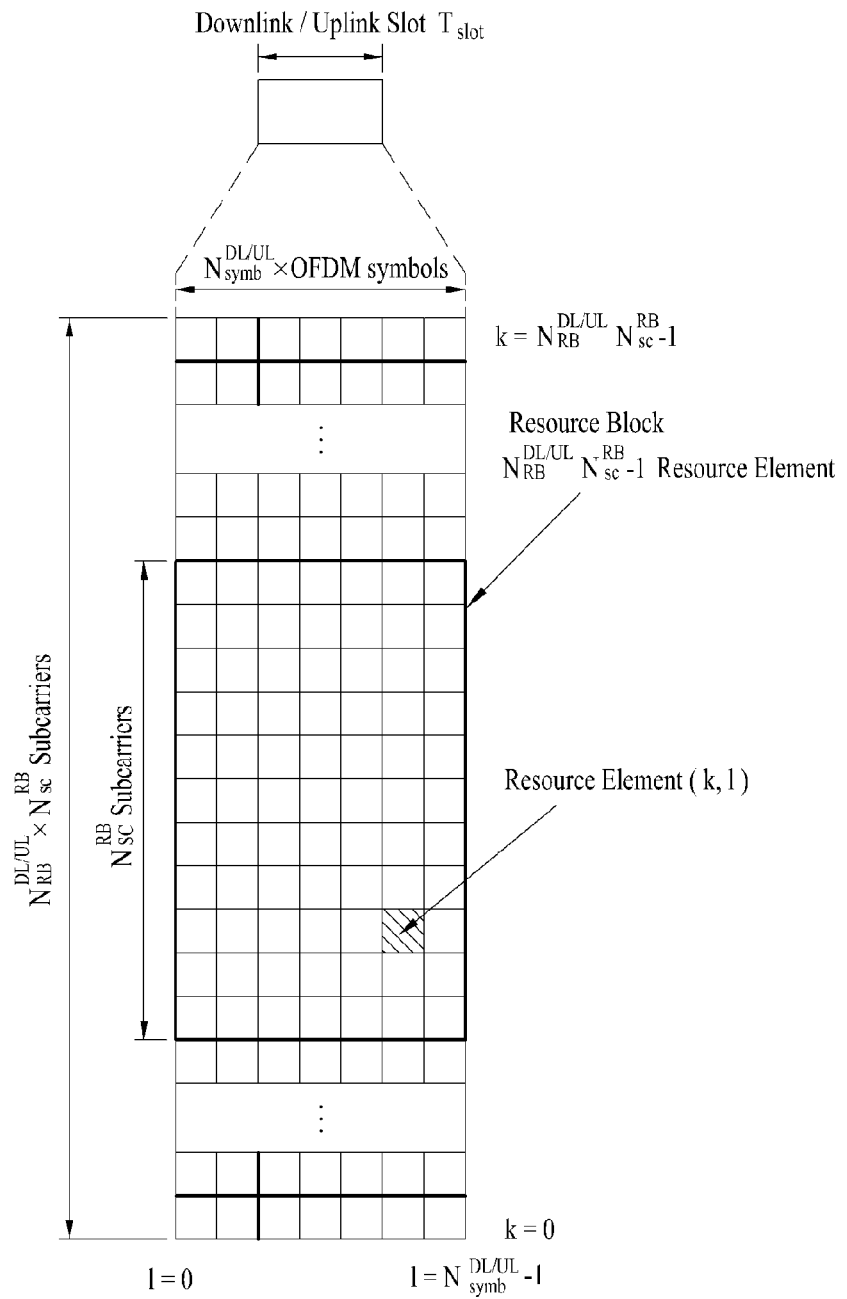
FIG. 4 illustrates an exemplary structure of a DownLink/UpLink (DL/UL) slot in the wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE/LTE-A system. There is one resource grid per antenna port.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 4, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DL/UL}_{RB}N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_o$) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb}\times N^{RB}_{sc}$ REs.

Each RE in the resource grid per each antenna port may be uniquely identified by an index pair (k, l) in a slot. k is a frequency-domain index ranging from 0 to $N^{DL/UL}_{RB}\times N^{RB}_{sc}-1$ and 1 is a time-domain index ranging from 0 to $N^{DL/UL}_{symb}-1$.

Figure 5:
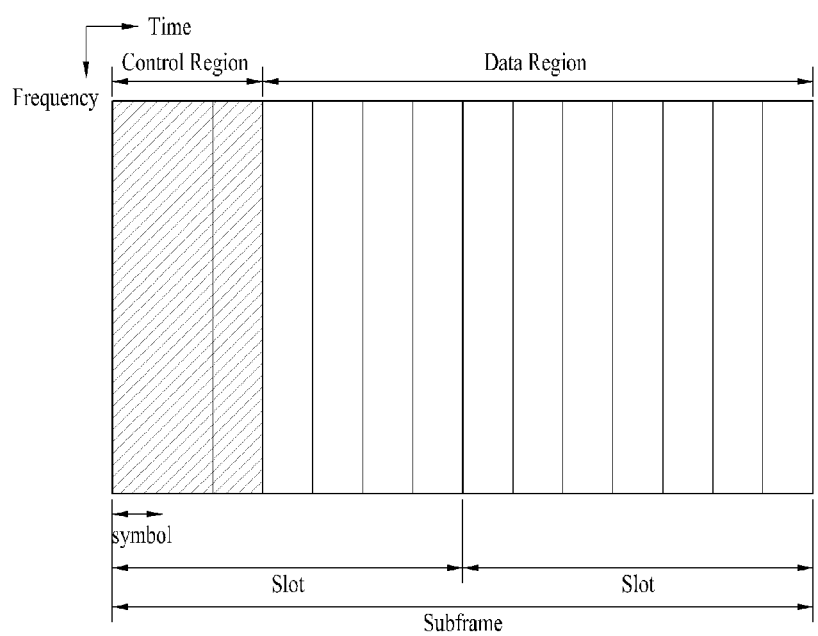
FIG. 5 illustrates an exemplary structure of a downlink (DL) subframe in the wireless communication system.

FIG. 5 illustrates an exemplary structure of a downlink (DL) subframe in the wireless communication system.

Referring to FIG. 5, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH (Physical Control Format Indicator CHannel). A BS may transmit control information to a UE or UEs in the control region. To transmit control information, a PDCCH (Physical Downlink Control CHannel), a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, etc. to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey data. PCH (Paging channel) and DL-SCH (Downlink-shared channel) may be transmitted on a PDSCH. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Multiple PDCCHs may be transmitted in a control region. The UE monitors the multiple PDCCHs so as to detect its own PDCCH. The DCI carried by one PDCCH has different sizes and usages according to a PUCCH format. If necessary, the DCI size may also be changed according to a coding rate.

The DCI format may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked as a unique ID for each UE in such a manner that each UE can receive its own PDCCH. However, the UE does not know where its own PDCCH is transmitted, such that the UE performs blind detection (also called blind decoding) of all PDCCHs of the corresponding DCI format for each subframe until one PDCCH having a UE ID is received or detected.

Figure 6:
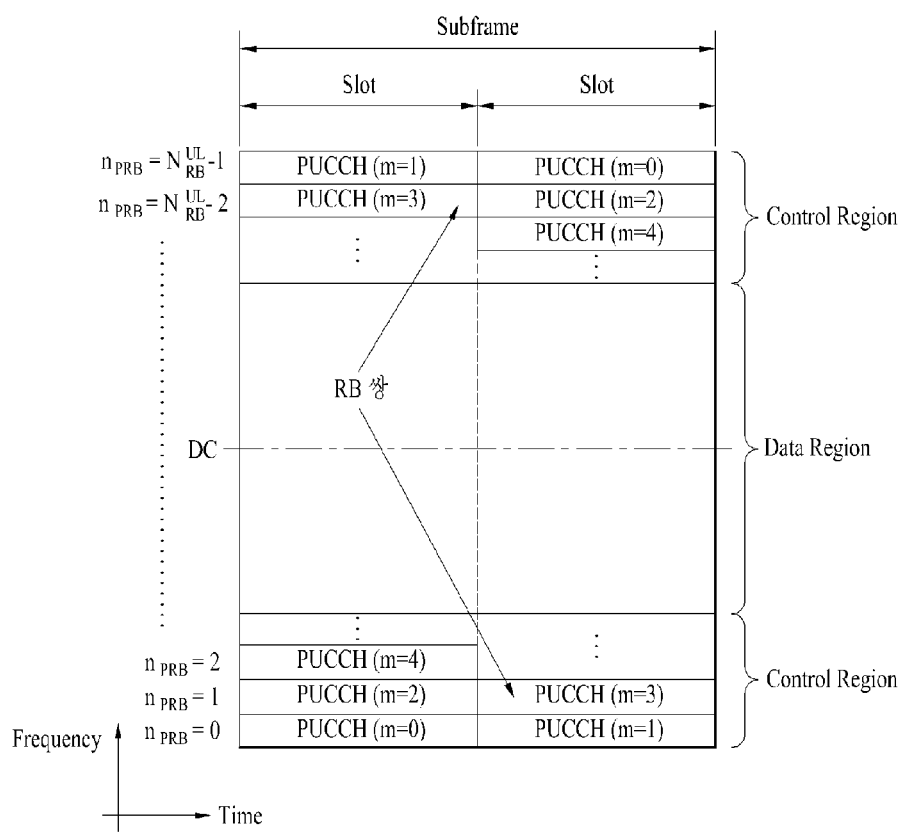
FIG. 6 illustrates an exemplary structure of an uplink (UL) subframe in the wireless communication system.

FIG. 6 illustrates an exemplary structure of a uplink (UL) subframe in the wireless communication system.

Referring to FIG. 6, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. In case that a UE adopts the SC-FDMA scheme for UL transmission, PUCCH and PUSCH cannot be transmitted simultaneously in order to maintain single carrier characteristics.

The UCI carried by one PUCCH has different sizes and usages according to the PUCCH format, and the UCI size may be changed according to the coding rate. For example, the PUCCH format may be defined as follows.

TABLE 1

| PUCCH format | Modulation scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint coding ACK/NACK (extended CP) |
| 2a | QPSK + BPSK | 21 | CQI + ACK/NACK | Normal CP only |
| 2b | QPSK + QPSK | 22 | CQI + ACK/NACK | Normal CP only |
| 3 | QPSK | 48 | SR + ACK/NACK | |

In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM/SC-FDM signal generator 306.

A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, PUCCHs for one UE are assigned to an RB pair contained in one subframe. Therefore, each PUCCH is transmitted through one RB in each slot contained in one UL subframe such that the same PUCCH is transmitted twice in one UL subframe.

Hereinafter, an RB pair used for each PUCCH transmission in one subframe is called a PUCCH region or PUCCH resource. For convenience of description, a PUCCH carrying ACK/NACK from among PUCCHs is called 'ACK/NACK PUCCH', a PUCCH carrying CQI/PMI/RI is called a Channel State Information (CSI) PUCCH, and a PUCCH carrying the SR is called an SR PUCCH.

The UE receives PUCCH resources for UCI transmission from the BS according to higher layer signaling or dynamic control signaling or implicit scheme.

Uplink Control Information (UCI) such as ACK/NACK (ACKnowlegement/negative ACK), Channel Quality Indicator (CQI), Precoding Matrix Indicator (PMI), Rank Information (RI), Scheduling Request (SR), etc. may be transmitted in a control region of the UL subframe.

In a wireless communication system, the BS and the UE mutually transmit/receive data. If BS/UE transmits data to UE/BS, the UE/BS decodes the received data. If the data is successfully decoded, the UE/BS transmits ACK to the BS/UE. If the data decoding fails, the UE/BS transmits NACK to the BS/UE. Basically, in the 3GPP LTE system, the UE receives a data unit (e.g., PDSCH) from the BS, and transmits ACK/NACK for each data unit to the BS through implicit PUCCH resources decided by PDCCH resources carrying scheduling information of the data unit.

Figure 7:
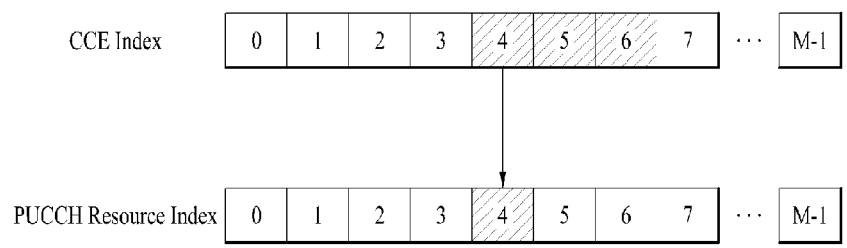
FIG. 7 illustrates an example for deciding PUCCH resources for ACK/NACK.

FIG. 7 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region through which a PDCCH is transmitted in each DL subframe is comprised of a plurality of Control Channel Elements (CCEs), and a PDCCH transmitted to the UE is comprised of one or more CCEs. The UE may transmit ACK/NACK through a PUCCH resource that is lined to a specific CCE index (e.g., the first CCE index) from among CCEs constructing a PDCCH received by the UE.

Referring to FIG. 7, each PUCCH resource index may correspond to a PUCCH resource for ACK/NACK. As can be seen from FIG. 7, if it is assumed that PDSCH scheduling information is transmitted to the UE through a PDCCH composed of 4-6-indexed CCEs (i.e., NOs. 4, 5, 6 CCEs), the UE transmits ACK/NACK to the BS through the 4-indexed PUCCH corresponding to a CCE having the lowest index (i.e., No. CCE 4) constructing the PDCCH. FIG. 7 shows the example in which a maximum of M' CCEs is present in a DL and a maximum of M PUCCHs is present in a UL. Although M' may be identical to M (M'=M), M' may be different from M as necessary, and CCE resource mapping may overlap with PUCCH resource mapping as necessary.

In the LTE system, PUCCH resource index is given according to the following equation.

$$n_{PUCCH}^{(1)} = n_{CCE} + N_{PUCCH}^{(1)} \qquad \text{Equation 1}$$

In Equation 1, $n^{(1)}_{PUCCH}$ is a PUCCH resource index for PUCCH format 1/1a/1b, $N^{(1)}_{PUCCH}$ is a signaling value received from a higher layer, and $n_{CCE}$ may be the smallest value from among CCE indexes used for PDCCH transmission Meanwhile, based upon a Code Division Multiplexing procedure using a cyclic time shift and orthogonal spreading codes, multiple ACK/NACKs from multiple UEs may be multiplexed to one PUCCH resource. Most particularly, by performing an SC-FDM symbol time domain spreading procedure using a cyclic time shift and orthogonal spreading codes within the SC-FDM symbols, orthogonality between the ACK/NACK signals among the UEs may be ensured. In a given SC-FDM symbol, different cyclic time shifts of a waveform (e.g., Zadoff-Chu (ZC) sequence) are modulated with a UE-specific QAM symbol carrying the necessary ACK/NACK information. Herein, in order to guarantee a low PAPR (Peak-to-Average Power Ratio) in an uplink, each waveform has a single carrier property. An SC-FDM symbol for each ACK/NACK with a small number of ACK/NACK bits (e.g., 1 bit or 2 bits) may be modulated by elements of an orthogonal spreading code. Accordingly, a 3GPP LTE PUCCH structure enabling multiple UEs to perform ACK/NACK transmission uses frequency-domain code multiplexing (different cyclic time shifts of a sequence) and/or time-domain code multiplexed (different orthogonal block spreading codes). Each PUCCH resource (or each PUCCH resource index) is mapped for a combination of a cyclic time shift and an orthogonal spreading code number.

Meanwhile, the BS reserves PUCCH resources within predetermined subframes for SR purposes of the UE through higher layer signaling (e.g., RRC (Radio Resource Control)). For example, by performing higher layer signaling, PUCCH resources may be reserved for each of a predetermined number of subframe to the UE for SR purposes. Then, based upon the higher layer SR signaling, the UE may decide the PUCCH resource, which is reserved to the UE for SR purposes, i.e., the UE may decide SR PUCCH resource. When the UE seeks to request the BS for an uplink scheduling, the UE may use the SR PUCCH resource, so as to transmit a modulation symbol 1, which indicates the SR. While the UE does not perform any uplink scheduling request, the UE does not transmit any information through the SR PUCCH. Essentially, when there is a signal received by the BS in a subframe, in which the SR PUCCH resource has been reserved, through the SR PUCCH resource, the BS may determine that an uplink scheduling request has been made by the UE. Conversely, when there is no signal received by the BS in a subframe, in which the SR PUCCH resource has been reserved, through the SR PUCCH resource, the BS may determine that an uplink scheduling request has not been made by the UE.

There may also occur a case when the ACK/NACK PUCCH resource, which is dynamically decided by the PDSCH resource, is located (or positioned) in the same subframe as the SR PUCCH resource. Even though it may be possible that multiple UEs can transmit uplink control information in one subframe by using the same PUCCH resource, in light of one UE, each UE may transmit the uplink control information in one subframe by using only one PUCCH resource. In other words, in the current 3GPP LTE system, the usage of multiple PUCCH resources is not allowed to one UE for transmitting uplink control information. Accordingly, when ACK/NACK information and information and control information (e.g., CQI/PMI/RI, SR and so on) are to be collectively transmitted in one subframe, the UE may piggyback the ACK/NACK information over another set of control information, so as to transmit the ACK/NACK information over the PUCCH, which is assigned to transmit the other control information. More specifically, when a CSI PUCCH resource or an SR PUCCH resource is allocated to a subframe, in which transmission of the ACK/NACK is required, the UE may use the CSI PUCCH resource or the SR PUCCH resource, so as to transmit the ACK/NACK information.

For example, referring to FIG. 6, there may occur a case when, in a subframe where a PUCCH (m=1) is reserved for the SR purpose of a specific UE, the PUCCH (m=3) may be decided as the ACK/NACK PUCCH resource. In this case, the specific UE may transmit the ACK/NACK information on the PUCCH (m=1) instead of the PUCCH (m=3). Since there exists a signal received by the BS on the PUCCH (m=1), which has been reserved for the specific UE, the BS may determine that an uplink scheduling request has been made by the specific UE.

When the ACK/NACK is being transmitted through the SR PUCCH resource, the ACK/NACK is modulated to a complex-valued modulation symbol over the SR PUCCH by performing BPSK or QPSK. For example, a 1-bit ACK/NACK or a 2-bit ACK/NACK may be modulated to a complex-valued modulation symbol in accordance with the table shown below.

TABLE 2

| Modulation | Binary bits | Modulation symbol |
|---|---|---|
| BPSK | 0 | 1 |
|  | 1 | −1 |
| QPSK | 00 | 1 |
|  | 01 | −j |
|  | 10 | j |
|  | 11 | −1 |

Meanwhile, based upon the current 3GPP LTE-A standard, regardless of the ACK/NACK bits, the ACK/NACK information may be mapped to 2 constellation points for the BPSK or 4 constellation points for the QPSK. Even if the number of ACK/NACK bits that are to be transmitted is greater than 2, the ACK/NACK information should be mapped to 4 constellation points, which correspond to constellation points specified for 2 bits. More specifically, one set of ACK/NACK information should be modulated to any one of the 2 different types of complex-valued modulation symbols (in case of the BPSK) or to any one of the 4 different types of complex-valued modulation symbols (in case of the QPSK).

Figure 8:
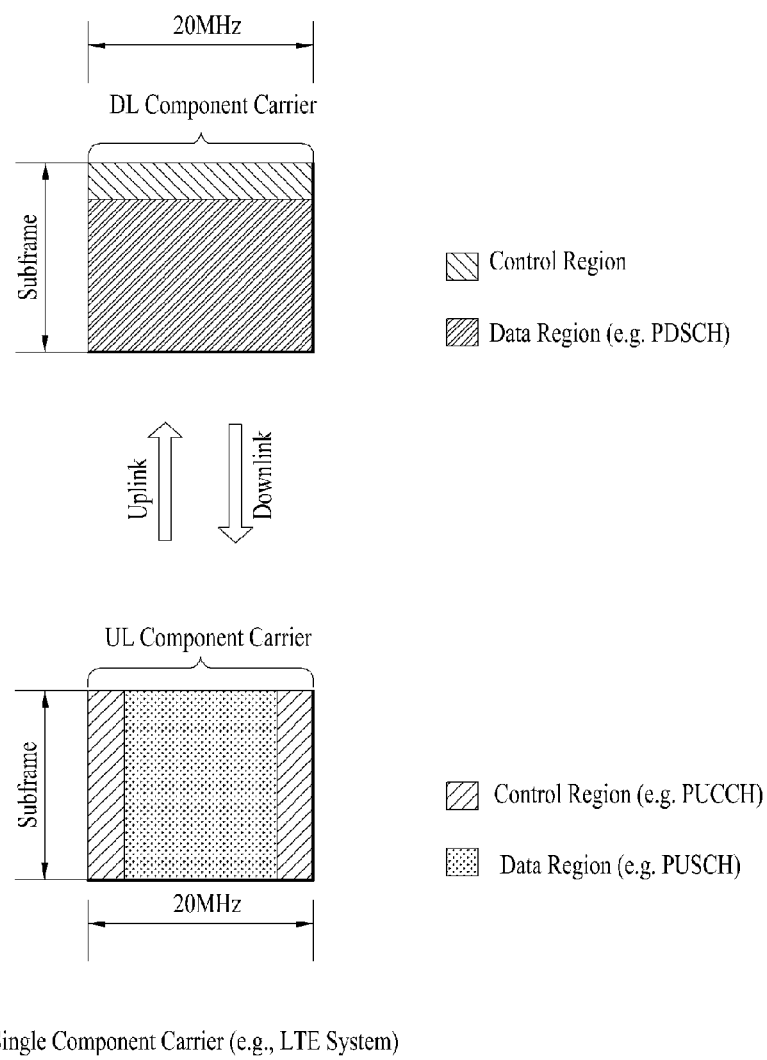
FIG. 8 shows exemplary communication under a single carrier situation.

FIG. 8 shows exemplary communication under a single carrier situation. The communication example shown in FIG. 8 may correspond to exemplary communication for the LTE system.

Referring to FIG. 8, a general FDD-type wireless communication system performs data transmission/reception through one DL band and one UL band corresponding to this DL band. The BS and the UE transmit/receive data and/or control information scheduled in units of a subframe. Data is transmitted/received through a data region configured in a UL/DL subframe, and control information is transmitted/received through a control region configured in a UL/DL subframe. For these operations, the UL/DL subframe may carry signals through various physical channels. Although FIG. 8 has disclosed only the FDD scheme for convenience of description, it should be noted that the scope or spirit of the present invention is not limited thereto, and can also be applied to the TDD scheme by dividing the radio frame of FIG. 8 according to an uplink (UL) and a downlink (DL) in a time domain.

Figure 9:
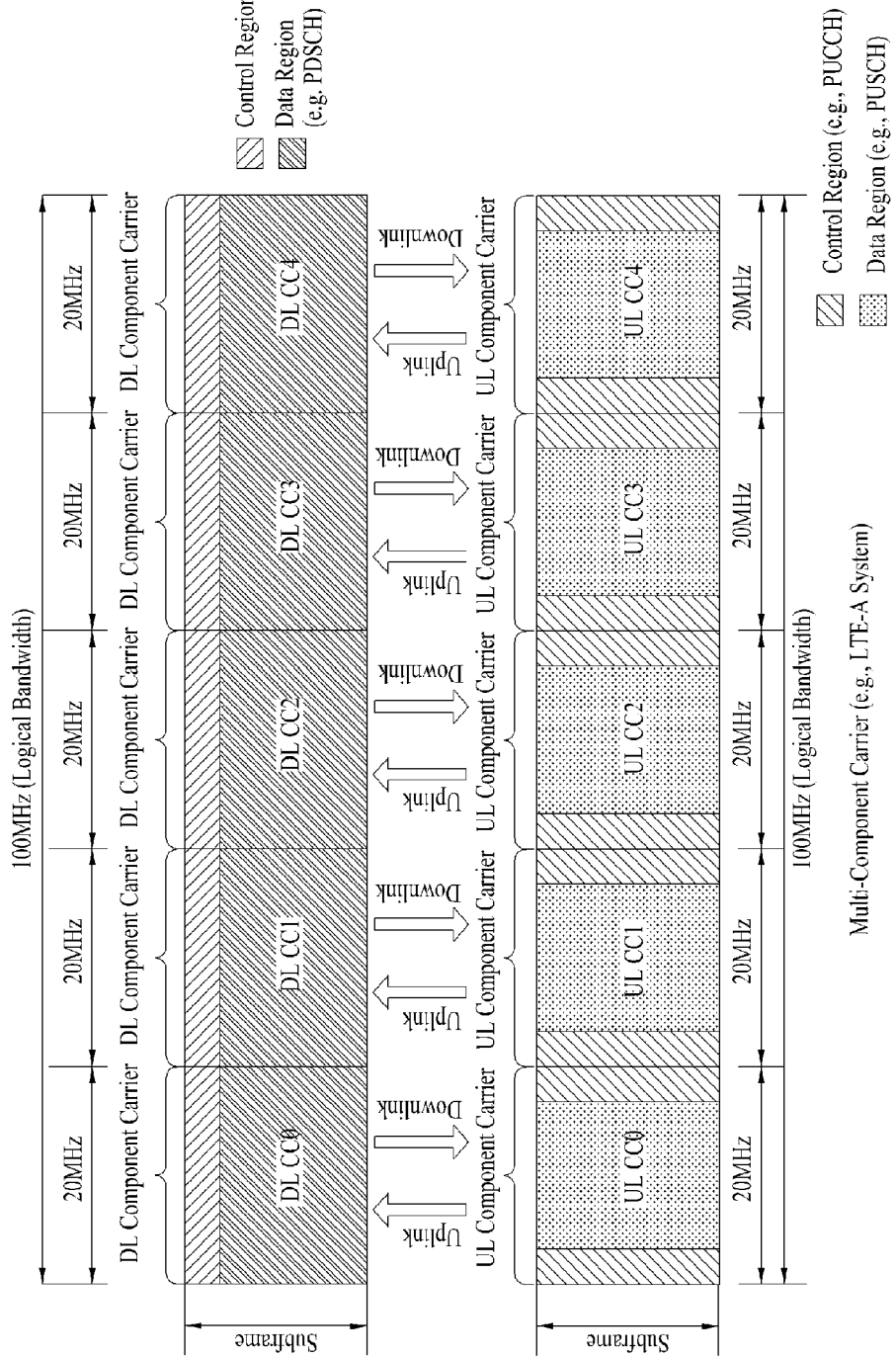
FIG. 9 shows exemplary communication under a multicarrier situation.

FIG. 9 shows exemplary communication under a multicarrier situation. The LTE-A system uses carrier aggregation or bandwidth aggregation technology that uses a larger bandwidth by aggregating several UL/DL frequency blocks. Each frequency block is transmitted by using a Component Carrier (CC). In the description of the present invention, depending upon the context, a Component Carrier may signify a frequency block designated for carrier aggregation or a central carrier of a frequency block (or may also be referred to as a central frequency, carrier frequency), and such terms may be used in combination. When only one component carrier is used for the communication, such communication may correspond to a communication performed under a single carrier situation, which is shown in FIG. 8.

For example, as can be seen from FIG. 9, five 20 MHz CCs are aggregated in each of UL and DL such that a 100 MHz bandwidth can be supported. Individual CCs may be contiguous or non-contiguous to each other in a frequency domain. FIG. 9 shows the example in which a UL CC bandwidth is symmetrically identical to a DL CC bandwidth. However, a bandwidth of each CC may be independently determined. For example, the UL CC bandwidth may be comprised of "5 MHz(UL CC0)+20 MHz(UL CC1)+20 MHz(UL CC2)+20 MHz(UL CC3)+5 MHz(UL CC4)". In addition, asymmetrical carrier aggregation in which the number of UL CCs is different from the number of DL CCs may also be achieved. The asymmetrical carrier aggregation may be generated by the limitation of an available frequency band or may be achieved by network configuration. For example, although the BS manages X CCs, a frequency band capable of being received in a specific UE may be limited to Y DL CCs (where Y≤X). Accordingly, the UE may monitor the DL signal/data being transmitted on the Y number of CCs. The BS may activate some or all of CCs managed by the BS, or may deactivate some CCs, such that a certain number of CCs may be assigned to the UE. The BS may change the activated/deactivated CCs and may change the number of activated/deactivated CCs. Meanwhile, the base station may configure Z number of DL CCs (wherein, 1≤Z≤y≤X), which are to be primarily monitored/received by the UE, as the main (or primary) DL CC, cell-specifically or UE-specifically. Various parameters for carrier aggregation may be established cell-specifically, UE group-specifically, or UE-specifically.

Once the BS cell-specifically or UE-specifically assigns a CC available to the UE, unless CC allocation to the UE may be wholly reconfigured or the UE is handed over, at least one of the allocated CCs is not deactivated. Hereinafter, the CC unable to be deactivated unless CC allocation to the UE is wholly reconfigured is referred to as a Primary CC (PCC), and a CC capable of being freely activated/deactivated by the BS is referred to as a secondary CC (SCC). Single carrier communication uses one PCC for communication between the UE and the BS, and the SCC is not used in communication. On the other hand, PCC and SCC may be distinguished from each other on the basis of control information. For example, specific control information may be transmitted/received only through a specific CC. Such specific CC is referred to as a PCC, and the remaining CC(s) may be referred to as SCC(s). The multicarrier communication uses one PCC for each UE or uses 0 or 1 secondary SCC(s). PCC may also be referred to as a primary cell, an anchor cell or a primary carrier. SCC may also be referred to as a secondary cell or a secondary carrier.

The LTE-A conceptually uses the concept 'cell' in order to manage radio resources. The cell is defined as a combination of DL resources and UL resources. That is, the cell is defined as a combination of DL CC and UL CC, and UL resources are not mandatory. Therefore, the cell may be comprised of only DL resources or may be comprised of DL resources and UL resources. If carrier aggregation is supported, a linkage between DL resource (or DL CC) carrier frequency and UL resource (or UL CC) carrier frequency may be designated by system information. The cell operated on the primary frequency (or PCC) may be referred to as a primary cell (PCell), and the cell(s) operated at a secondary frequency (or SCC) may be referred to as a secondary cell(s) (SCells). The PCell is used for performing an initial connection establishment process is performed or a connection re-establishment process is started. PCell may also indicate the cell indicated in a handover process. A SCell may be configured after RRC connection establishment and may also be used to provide additional radio resources. PCell and SCell may be generically named as serving cells. Therefore, in the case of the UE that is in an RRC_CONNECTED state, does not establish or support carrier aggregation, there is only one serving cell composed of only PCell. In contrast, in the case of another UE that is in the RRC_CONNECTED state and establishes carrier aggregation, one or more serving cells may be present, one PCell and at least one SCell may form the entire serving cells. After the initial security activation process is started, the network may add one or more SCells to the initially configured PCell in a connection establishment process for the UE supporting carrier aggregation.

In a multicarrier system, the BS may transmit several data units to the UE through given cell(s) (or CC(s)), and the UE may transmit ACK/NACKs for the several data units in one subframe. The UE may be assigned one or more DL CCs for receiving a PDSCH carrying DL data. The DL CC(s for the UE may be semi-statically configured through RRC signaling. In addition, DL CC(s) for the UE may be dynamically activated/deactivated through L1/L2 (MAC) signaling. Therefore, a maximum number of ACK/NACK bits to be transmitted by the UE may be changed according to the DL CC(s) available to the UE. That is, a maximum number of ACK/NACK bits to be transmitted by the UE may be changed according to the DL CC(s) configured/re-configured by RRC signaling or activated by L1/L2 signaling.

Figure 10:
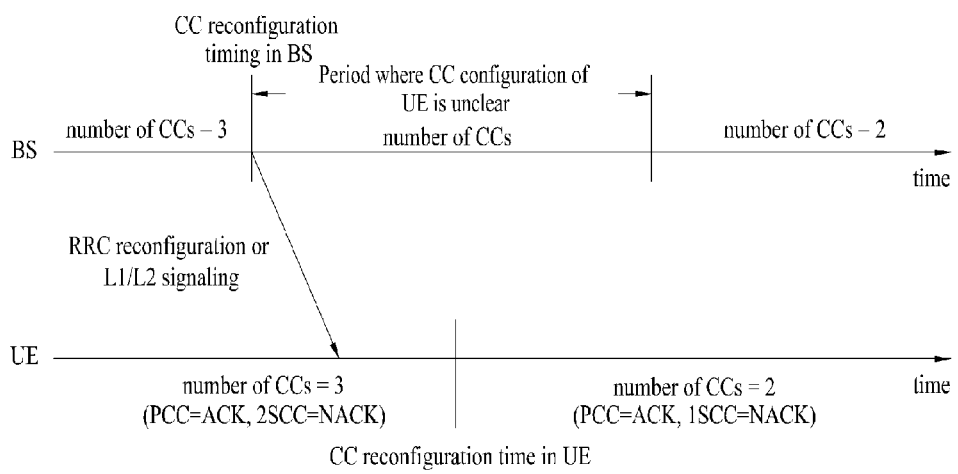
FIG. 10 illustrates exemplary operations of the base station and the user equipment in a DL CC variation period.

FIG. 10 illustrates exemplary operations of the base station and the user equipment in a DL CC variation period.

When the BS changes (or modifies) the DL CC(s) that is/are available to the UE by performing RRC reconfiguration or L1/L2 control signaling, the timing starting from which the BS and the UE respectively applies the changed DL CC(s) may be different from one another. For example, referring to FIG. 10, when the BS changes the number of CCs available to the UE from 3 to 2, the time point at which the BS changes the number of DL CCs from 3 to 2 and transmits downlink data may be different from the time point at which the UE changes the number of DL CCs monitored by the UE from 3 to 2. Additionally, even if the BS directs a change in the number of CCs, if the UE fails to receive such directions, a period (or time interval) in which the number of DL CCs known by the UE and the number of DL CCs known by the BS are different may occur.

A UE, which is informed of the number of DL CCs as being equal to 3, may determine whether or not each of the 3 DL CCs has been successfully received, and the UE may map the ACK/NACK for the 3 DL CCs to one modulation symbol over the SR PUCCH and may transmit the mapped ACK/NACK to the BS. For example, when the PCC corresponds to an ACK, and when each of the 2 SCCs corresponds to an NACK, the UE transmits a modulation symbol corresponding to (ACK, NACK, NACK) over one SR PUCCH, which is included in one subframe. Alternatively, UE, which is informed of the number of DL CCs as being equal to 2, may determine whether or not each of the 2 DL CCs has been successfully received, and the UE may map the ACK/NACK for the 2 DL CCs to one modulation symbol on the SR PUCCH and may transmit the mapped ACK/NACK to the BS. For example, when the PCC corresponds to an ACK, and when 1 SCC corresponds to an NACK, the UE transmits a modulation symbol corresponding to (ACK, NACK) over one SR PUCCH, which is included in one subframe. Even if the BS changes the number of CCs to 2, the UE may still transmit ACK/NACK for 3 DL CCS.

The BS, which knows that the number of DL CCs is equal to 2, expects to receive an ACK/NACK for each of the 2 DL CCs. While the BS recognizes the number of DL CCs to be equal to 2, when the UE transmits ACK/NACK for 3 DL CCs, the BS may attempt to perform demodulation, based upon the ACK/NACK for 2 DL CCs corresponding to the ACK/NACK received from the UE. Accordingly, the received ACK/NACK may not be accurately demodulated. This is because the mapping relation between the ACK/NACKs for the 2 DL CCs and the modulation symbols over the SR PUCCH and the mapping relation between the ACK/NACKs for the 3 DL CCs and the modulation symbols over the SR PUCCH are different from one another.

In order to resolve such disadvantages, the present invention proposes exemplary embodiments for maintain the mapping of an ACK/NACK for a specific CC to the SR PUCCH, regardless of the number of CCs. The specific CC may correspond to a PCC, which is not deactivated with the exception for cases when a CC of the UE is entirely reconfigured or when the UE performs handover. Meanwhile, in the present invention, in case of a TDD system, the mapping of an ACK/NACK for a specific CC of a specific subframe to the SR PUCCH, regardless of the number of CCs and the number of downlink subframes. The specific subframe may be statically decided or may be dynamically selected in accordance with downlink link data scheduling information.

Figure 11:
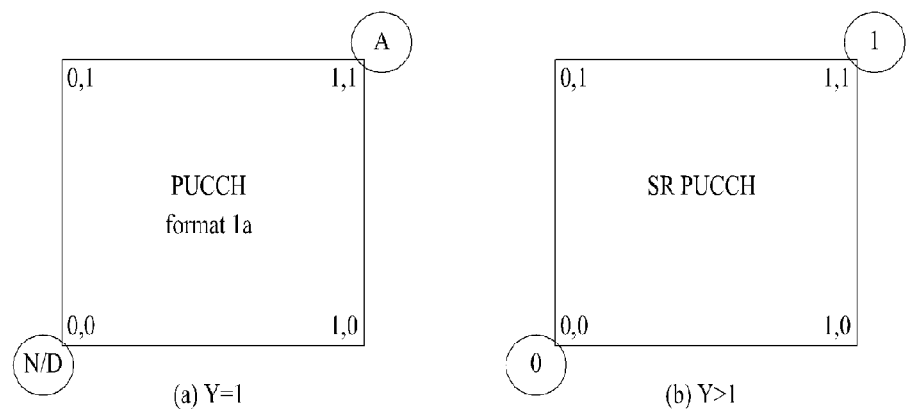
FIGS. 11, 12 and 13 illustrate examples example of mapping an ACK/NACK to an SR PUCCH according to first to third embodiments of the present invention, respectively.
Figure 12:
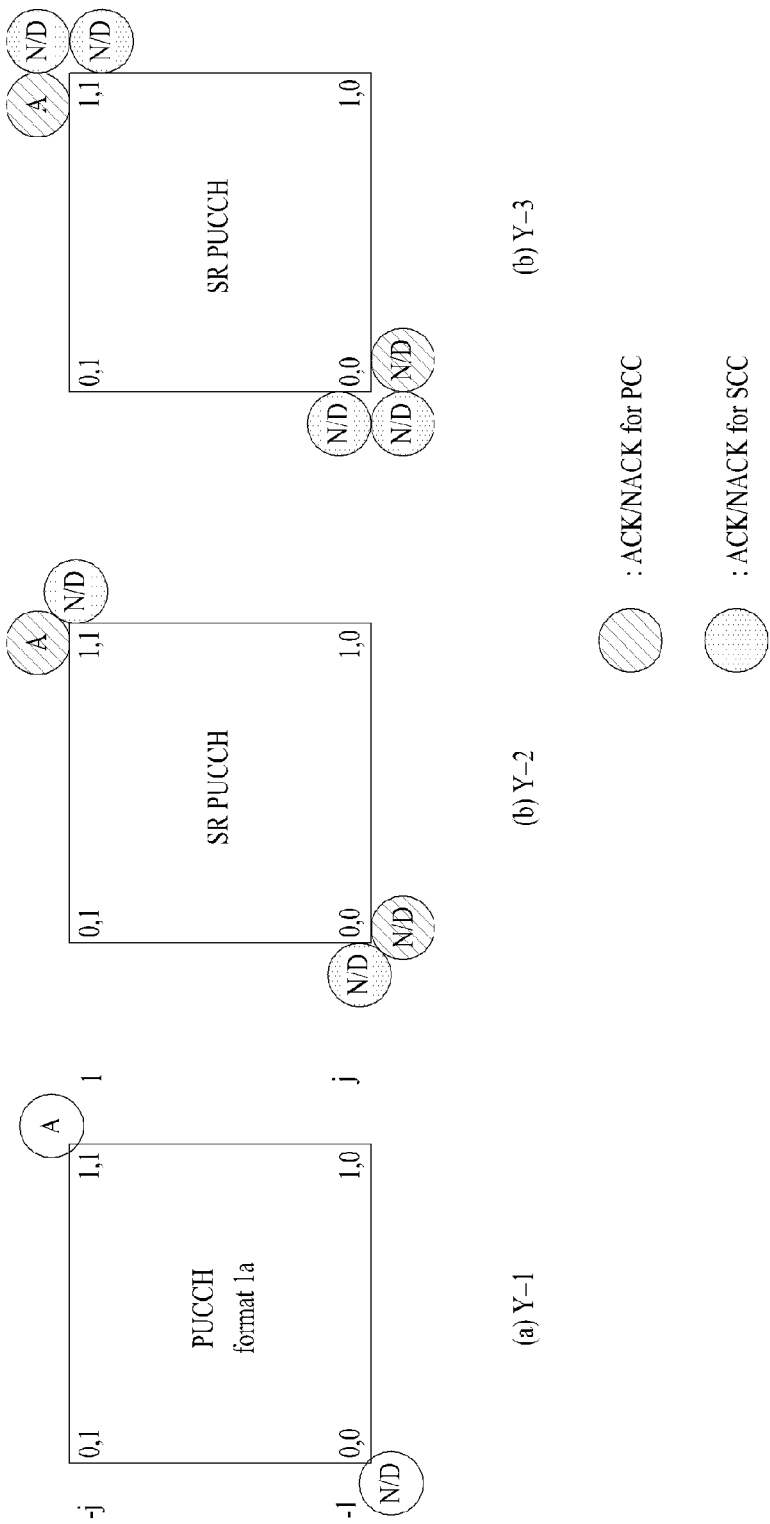
Figure 13:
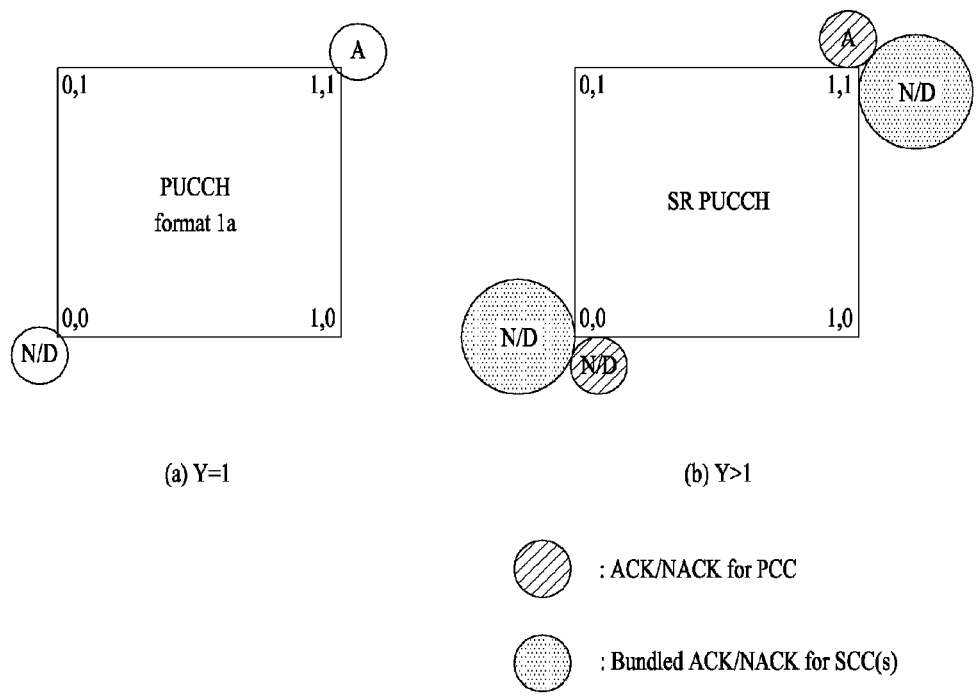

FIG. 11 to FIG. 13 illustrate exemplary embodiments for mapping the ACK/NACK to the SR PUCCH according to the present invention. Referring to FIG. 11 to FIG. 13, Y represents the number of DL CCs, A indicates ACK, and N/D represents NACK or DTX (Discontinuous Transmission). When the UE has successfully received downlink data over the CC, the UE determines the reception of the CC as an ACK. When the UE has expected to receive the CC but the UE fails to receive the CC, the UE determines the reception of the CC as a DTX. When the UE receives the CC but the reception of the CC is not successful, the UE determines the reception of the CC as an NACK. The exemplary embodiments of the present invention are applied regardless of whether the UE determined the predetermined CC as NACK or as DTX. Hereinafter, without differentiating the NACK from the DTX, the exemplary embodiments of the present invention will be described in detail, while collectively referring to the NACK and the DTX as NACK.

Additionally, referring to FIG. 11 to FIG. 13, the four points of a square respectively indicate 4 constellation points of a QPSK modulation. In case of the QPSK modulation, ACK/NACK information is mapped to any one of the 4 constellation points (0,0), (0,1), (1,0), (1,1). In case of the BPSK modulation, ACK/NACK information is mapped to any one of 2 constellation points over a real number axis, e.g., any one of (0,0) and (1,1), or ACK/NACK information is mapped to any one of 2 constellation points over a imaginary number axis, e.g., any one of (0,1) and (1,0). Hereinafter, the exemplary embodiments of the present invention will be described in detail under the assumption that the constellation points (0,0), (0,1), (1,0), (1,1) respectively correspond to 1, −j, j, −1.

FIG. 11 illustrates an example of mapping an ACK/NACK to an SR PUCCH according to a first embodiment of the present invention.

Referring to FIG. 11(a), when the number of DL CCs Y=1, the BPSK is used for transmitting 1 bit of ACK/NACK. When 1 DL CC is determined as an ACK, the UE modulates the ACK/NACK information indicating (ACK) to a complex-valued modulation symbol 1. And, then, the UE may use an SR PUCCH resource, so as to transmit the complex-valued modulation symbol 1. Additionally, when 1 DL CC is determined as an ACK, the UE modulates the ACK/NACK information indicating (NACK) to a complex-valued modulation symbol −1. And, then, the UE may use an SR PUCCH resource, so as to transmit the complex-valued modulation symbol −1.

Referring to FIG. 11(b), when the number of DL CCs Y is greater than 1, the UE may use the QPSK for transmitting information indicating the number of ACKs to the BS. When it is assumed that a maximum of 5 DL CCs can be allocated to the UE, the UE may generate ACK/NACK information indicating the number of ACKs in accordance with the table shown below.

TABLE 3

| Number of ACK | Binary bits |
| --- | --- |
| 0 | 00 |
| 1 | 11 |
| 2 | 10 |
| 3 | 01 |
| 4 | 11 |
| 5 | 10 |

For example, referring to Table 3, when the UE fails to detect all of the DL CCs, or when the decoding process of the DL data transmitted over all of the DL CCs has not been successfully performed, the UE may generate ACK/NACK information indicating that the number of ACKs is equal to 0. When the UE successfully receives the DL data over only one CC, and when the UE fails to successfully receive DL data over the remaining CCs, the UE may generate ACK/NACK information indicating that the number of ACKs is equal to 1. When the UE receives 5 CCs, and when the UE successfully decodes the data of all 5 CCs, the UE may generate ACK/NACK information indicating that the number of ACKs is equal to 5. The UE may map the above-mentioned 6 different cases to 4 constellation points by using the QPSK. Since the number of constellation points, i.e., 4, that can be mapped is smaller than the number of different types of ACK/NACK information, i.e., 6, that are to be mapped, at least 2 types of the ACK/NACK information are required to be mapped to the same constellation point of another ACK/NACK information type in an overlaying format.

When mapping 6 different types of ACK/NACK information to 4 constellation points, the UE according to the first embodiment of the present invention maps the ACK/NACK information indicating that the number of ACKs is equal to 0, to the same constellation point as the constellation point, to which the ACK information corresponding to a case when Y=1 is mapped. And, the UE according to the first embodiment of the present invention maps the ACK/NACK information indicating that the number of ACKs is equal to 1, to the same constellation point as the constellation point, to which the NACK information corresponding to a case when Y=1 is mapped. For example, referring to FIG. 11, the UE modulates the ACK/NACK information indicating that the number of ACKs is equal to 0 to a complex-valued modulation symbol −1. And, the UE modulates the ACK/NACK information indicating that the number of ACKs is equal to 1 to a complex-valued modulation symbol 1. Thereafter, the remaining number of ACKs, i.e., ACK/NACKs corresponding to when the number of ACKs=2, 3, 4, 5, are respectively mapped to any one of the 4 constellation points. Herein, different ACK/NACK information may be mapped to the same constellation point.

As shown in FIG. 11(a) and FIG. 11(b), according to the first embodiment of the present invention, regardless of the number of Y, when the number of ACKs is equal to 0, the ACK/NACK information is modulated to a complex-valued modulation symbol −1, and when the number of ACKs is equal to 1, the ACK/NACK information is modulated to a complex-valued modulation symbol 1. Regardless of the number of DL CCs, which is configured by the BS, when the BS receives the complex-valued modulation symbol −1 on the SR PUCCH, it may be known that the UE has successfully received DL data over 0 number of DL CCs. And, when the BS receives the complex-valued modulation symbol 1 on the SR PUCCH, it may be known that the UE has successfully received DL data over 1 DL CC.

According to the first embodiment of the present invention, during a period where the DL CC configuration of the UE is unclear, by scheduling DL data only to a specific DL CC (or in case of a TDD, only to a specific subframe of a specific DL CC), the BS may accurately receive the ACK/NACK for the specific DL CC. For example, after signaling the UE of a DL CC reconfiguration or of a DL CC change, during a predetermined time period, the BS may transmit data only over the PCC. Regardless of Y recognized by the UE, when the UE successfully receives DL data over 1 CC, the UE may modulate the ACK/NACK information to the complex-valued modulation symbol 1 and transmit the modulated symbol over the SR PUCCH. And, when the UE successfully receives DL data over 0 CC, the UE may modulate the ACK/NACK information to the complex-valued modulation symbol −1 and transmit the modulated symbol on the SR PUCCH. When the BS receives the complex-valued modulation symbol 1 on the SR PUCCH, the BS may determine that the DL data transmitted using the PCC have been successfully transmitted to the UE. And, when the BS receives the complex-valued modulation symbol −1 on the SR PUCCH, the BS may determine that the DL data transmission using the PCC has failed.

FIG. 12 illustrates an example of mapping an ACK/NACK to an SR PUCCH according to a second embodiment of the present invention. As it is described above in FIG. 11(a), FIG. 12(a) illustrates an exemplary 1-bit ACK/NACK transmission, when the number of DL CCs Y=1.

Referring to FIG. 12(b) and FIG. 12(c), when Y is greater than 1, the UE transmits a combination of the ACK/NACK for the DL CCs to the BS as ACK/NACK information. At this point, the UE according the second embodiment of the present invention maps a combination of the 1-bit ACK for a specific CC and (Y−1)-bit NACK for all of the remaining CCs excluding the specific CC to a constellation point, which is identical to the constellation point to which the 1-bit ACK is mapped when Y=1, e.g., (1,1). Additionally, the UE may map a combination of Y-bit NACKs for all of the CCs including the specific CC to a constellation point, which is identical to the constellation point to which the 1-bit NACJ is mapped when Y=1, e.g., (0,0).

For example, referring to FIG. 12(b), when Y=2, the UE may modulate a 2-bit ACK/NACK, which indicates that the PCC corresponds to the ACK and that the SCC corresponds to the NACK, to complex-valued modulation symbol 1. And, the UE may also modulate a 2-bit ACK/NACK, which indicates that both the PCC and the SCC correspond to the NACK, to complex-valued modulation symbol −1. Among the other ACK/NACK states, for example, the state when (PCC=NACK, SCC=ACK) and the state when (PCC=ACK, SCC=ACK) may be mapped to 2 constellation points from among 4 constellation points.

In another example, referring to FIG. 12(c), when Y=3, the UE may modulate a 3-bit ACK/NACK, which indicates that the PCC corresponds to the ACK and that the remaining 2 SCCs correspond to NACKs, to complex-valued modulation symbol 1. And, the UE may also modulate a 3-bit ACK/NACK, which indicates that the PCC and both SCCs correspond to NACKs, to complex-valued modulation symbol −1. Among the other ACK/NACK states, for example, the state when (PCC=ACK, SCC1=ACK, SCC2=ACK), the state when (PCC=ACK, SCC1=ACK, SCC2=NACK), the state when (PCC=ACK, SCC1=NACK, SCC2=ACK), the state when (PCC=NACK, SCC1=ACK, SCC2=ACK), the state when (PCC=NACK, SCC1=NACK, SCC2=ACK), and the state when (PCC=NACK, SCC1=ACK, SCC2=NACK) may be mapped to 4 constellation points. Since the number of ACK/NACK states, i.e., 8, is greater than the number of constellation points that are available for mapping, i.e., 4, different ACK/NACK states may be mapped to the same constellation points.

As shown in FIG. 12(a) to FIG. 12(c), according to the second embodiment of the present invention, regardless of the size of Y, the ACK/NACK information indicating that the state of a specific CC is ACK, and that the state of the remaining CCs is NACK (including the case when the remaining number of CCs is equal to 0), is modulated to a complex-valued modulation symbol 1. Additionally, regardless of the size of Y, the ACK/NACK information indicating that the state of CCs, including the specific CC, is NACK, is modulated to a complex-valued modulation symbol −1. Regardless of the number of DL CCs configured by the BS, when the BS receives the complex-valued modulation symbol −1 on the SR PUCCH, which is reserved for the UE, it may be known that the UE has successfully received DL data over 0 DL CC. And, when the BS receives the complex-valued modulation symbol 1 on the SR PUCCH, it may be known that the UE has successfully received DL data over 1 DL CC.

According to the second embodiment of the present invention, during a period where the DL CC configuration of the UE is unclear, by scheduling DL data only to a specific DL CC, the BS may accurately receive the ACK/NACK for the specific DL CC. For example, after signaling the UE of a DL CC reconfiguration or of a DL CC change, during a predetermined time period, the BS may transmit data only over the PCC. Regardless of Y recognized by the UE, when the UE according to the second embodiment of the present invention successfully receives DL data over the PCC and fails to receive the DL data over the remaining CCs, the UE may modulate the ACK/NACK information to the complex-valued modulation symbol 1 and transmit the modulated symbol on the SR PUCCH. And, regardless of the value of Y, when the UE fails to receive DL data over all of the CCs, the UE may modulate the ACK/NACK information to the complex-valued modulation symbol −1 and transmit the modulated symbol on the SR PUCCH. When the BS receives the complex-valued modulation symbol 1 on the SR PUCCH, the BS may determine that the DL data have been successfully transmitted to the UE over the PCC. And, when the BS receives the complex-valued modulation symbol −1 on the SR PUCCH, the BS may determine that the transmission of the DL data to the UE has failed even over the PCC.

For reference, in FIG. 12, the ACK or NACK for each CC may correspond to bundled ACK or NACK. More specifically, when one CC carriers more than 1 codeword, i.e., when spatial multiplexing is applied to the CC, the ACK for one CC may indicate that ACK/NACK(s) for all of the multiple codewords, which are transmitted by using the CC, corresponds to the ACK(s), the NACK for the CC may indicate that ACK/NACK(s) for at least one or more of the multiple codewords, which are transmitted by using the CC, corresponds to NACK(s).

FIG. 13 illustrates an example of mapping an ACK/NACK to an SR PUCCH according to a third embodiment of the present invention. As it is described above in FIG. 11(a) and FIG. 12(a), FIG. 13(a) illustrates an exemplary 1-bit ACK/NACK transmission, when the number of DL CCs Y=1.

Referring to FIG. 13(b), when Y is greater than 1, by bundling the ACK/NACK for CCs excluding a specific CC, e.g., PCC, using an AND logical calculation operation, the UE may generate a 1-bit ACK/NACK for the remaining CCs. The UE may transmit a combination of the 1-bit ACK/NACK for the specific CC and the bundled 1-bit ACK/NACK for the CCs other than the specific CC to the BS as the ACK/NACK information.

At this point, the UE according to the third embodiment of the present invention may map the combination of the ACK for the specific CC and the NACK for all of the remaining CCs, excluding the specific CC, to a constellation point, which is identical to the constellation point to which the NACK information corresponding to the case when Y=1, e.g., (1,1). And, the UE may also map the combination of the NACK for the specific CC and the NACK for all of the remaining CCs, excluding the specific CC, to a constellation point, which is identical to the constellation point to which the NACK information corresponding to the case when Y=1, e.g., (0,0).

Referring to FIG. 13(b), when Y is greater than 1, the UE may modulate a combination of a 1-bit ACK/NACK indicating that an ACK/NACK for the PCC corresponds to an ACK and a 1-bit ACK/NACK indicating a bundled NACK for all of the remaining SCCs into a complex-valued modulation symbol 1. And, the UE may also modulate a combination of a 1-bit ACK/NACK indicating that an ACK/NACK for the PCC corresponds to an NACK and a 1-bit ACK/NACK indicating that ACK/NACK(s) for all the remaining SCC(s) correspond(s) to an NACK into a complex-valued modulation symbol −1. Herein, the bundled NACK indicates that an ACK/NACK for at least one of the CCs, which participate in the bundling process, corresponds to NACK. For example, the UE may configure a 2-bit ACK/NACK, which consists of a 1-bit MSB (Most Significant Bit) corresponding to the PCC and a 1-bit LSB (Least Significant Bit) corresponding to bundled SCCs. The UE may generate ACK/NACK information 10b indicating the state when (PCC=ACK, bundled SCC=NACK), and the UE may modulate the 10b to complex-valued modulation symbol 1. Additionally, the UE may generate ACK/NACK information 00b indicating the state when (PCC=NACK, bundled SCC=NACK), and the UE may modulate the 00b to complex-valued modulation symbol −1. Among the other ACK/NACK states, for example, the state when (PCC=NACK, bundled SCC=ACK) and the state when (PCC=ACK, bundled SCC=ACK) may be mapped to 2 constellation points from among 4 constellation points.

As shown in FIG. 13(a) to FIG. 13(b), according to the third embodiment of the present invention, regardless of the size of Y, the ACK/NACK information indicating that the state of a specific CC is ACK, and that the state of at least one of the remaining CCs (including the case when the remaining number of CCs is equal to 0) is NACK, is modulated to a complex-valued modulation symbol 1. Additionally, regardless of the size of Y, the ACK/NACK information indicating that the state of a specific CC is NACK, and that the state of at least one of the remaining CCs (including the case when the remaining number of CCs is equal to 0) is NACK, is modulated to a complex-valued modulation symbol −1. Regardless of the number of DL CCs configured by the BS, when the BS receives the complex-valued modulation symbol −1 on the SR PUCCH, which is reserved for the UE, it may be known that the UE has successfully received DL data over 0 DL CC. And, when the BS receives the complex-valued modulation symbol 1 on the SR PUCCH, it may be known that the UE has successfully received DL data over 1 DL CC.

According to the third embodiment of the present invention, during a period where the DL CC configuration of the UE is unclear, by scheduling DL data only to a specific DL CC, the BS may accurately receive the ACK/NACK for the specific DL CC. For example, after signaling the UE of a DL CC reconfiguration or of a DL CC change, during a predetermined time period, the BS may transmit data only over the PCC. Regardless of the value of Y recognized by the UE, when the UE according to the third embodiment of the present invention successfully receives DL data over the PCC and fails to receive the DL data over at least one of the remaining CCs, the UE may modulate the ACK/NACK information to the complex-valued modulation symbol 1 and transmit the modulated symbol on the SR PUCCH. And, regardless of the value of Y, when the UE fails to receive DL data over the PCC and also fails to receive the DL data over at least one of the remaining CCs, the UE may modulate the ACK/NACK information to the complex-valued modulation symbol −1 and transmit the modulated symbol on the SR PUCCH. When the BS receives the complex-valued modulation symbol 1 on the SR PUCCH, the BS may determine that the DL data have been successfully transmitted to the UE over the PCC. And, when the BS receives the complex-valued modulation symbol −1 on the SR PUCCH, the BS may determine that the transmission of the DL data to the UE has failed even over the PCC.

For reference, in FIG. 13, the ACK or NACK for each CC may correspond to bundled ACK or NACK. More specifically, when one CC carriers more than 1 codeword, i.e., when spatial multiplexing is applied to the CC, the ACK for one CC may indicate that all of the multiple codewords, which are transmitted by using the CC, corresponds to the ACK, the NACK for the CC may indicate that ACK/NACK(s) for at least one or more of the multiple codewords, which are transmitted by using the CC, correspond(s) to NACK(s).

In other words, according to the first embodiment to the third embodiment of the present invention, when an ACK/NACK for a specific CC corresponds to an ACK, and when the ACK/NACK for the remaining CC(s) corresponds to an NACK (the exemplary case corresponding to the second embodiment of the present invention) or to bundled NACKs (the exemplary case corresponding to the third embodiment of the present invention), regardless of the number of CCs, all of the ACK/NACK information for the specific CC and the other CC(s) are modulated to the same complex-valued modulation symbol (the first complex-valued modulation symbol), for example, to 1. Additionally, when the ACK/NACK for all of the CCs including the specific CC correspond to NACKs (the exemplary case corresponding to the second embodiment of the present invention) or to bundled NACKs (the exemplary case corresponding to the third embodiment of the present invention), regardless of the number of CCs, all of the ACK/NACK information for the CCs including the specific CC are modulated to the same complex-valued modulation symbol (the second complex-valued modulation symbol), for example, to −1.

Figure 14:
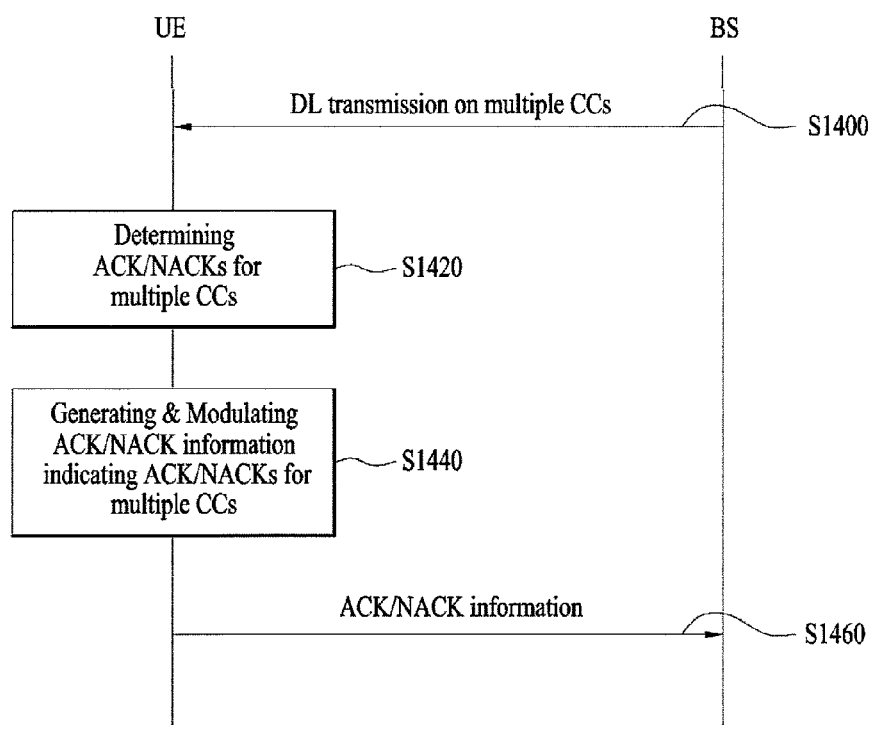
FIG. 14 illustrates an example of a flow diagram showing ACK/NACK information transmission/reception between and UE and BS.

FIG. 14 illustrates an example of a flow diagram showing ACK/NACK information transmission/reception between a UE and a BS. By receiving a higher layer signaling message from the BS, a processor (400*a*) of the UE, which is configured according to the exemplary embodiment of the present invention may be allocated with at least one or more CCs for the UE. Referring to FIG. 14, the UE processor (400*a*) may receive DL data from the BS through the allocated CCs (S1400). The UE processor (400*a*) may determine whether or not the DL data have been successfully received for each of the CCs through the respective CC (S1420), so as to generate ACK/NACK information for the CC(s) (S1440), which are to be configured for the UE.

The UE processor (400*a*), which is configured according to the first embodiment of the present invention, may generate information indicating the number of ACKs as the ACK/NACK information. The UE processor (400*a*), which is configured according to the second embodiment of the present invention, may configure ACK/NACK information of Y bits, which correspond to a combination of ACK/NACK for each of the Y number of CC(s), which are configured for the UE. The UE processor (400*a*), which is configured according to the third embodiment of the present invention, may configure 2-bit ACK/NACK information, which consists of a 1-bit ACK/NACK for a specific CC and 1 bit of bundled ACK/NACK for the remaining CCs.

The UE processor (400*a*) controls a UE transmitter (100*a*) so that the UE transmitter (100*a*) can modulate the ACK/NACK information in accordance with a pre-defined modulation scheme (S1440). For example, when Y=1, the UE processor (400*a*) may control the UE transmitter (100*a*) so that the UE transmitter (100*a*) can modulate the 1-bit ACK/NACK information, which indicates the ACK for 1 CC, to a first complex-valued modulation symbol, and the UE processor (400*a*) may control the UE transmitter (100*a*) so that the UE transmitter (100*a*) can modulate the ACK/NACK information, which indicates the NACK for 1 CC, to a second complex-valued modulation symbol.

When Y is greater than 1, the UE processor (400*a*) according to the first embodiment of the present invention may control the UE transmitter (100*a*), so that the UE transmitter (100*a*) can modulate the ACK/NACK information, which indicates that the number of CCs corresponding to the ACK is equal to 1, to the first complex-valued modulation symbol, and so that the UE transmitter (100*a*) can modulate the ACK/NACK information, which indicates that the number of CCs corresponding to the ACK is equal to 0, to the second complex-valued modulation symbol. When Y is greater than 1, the UE processor (400*a*) according to the second embodiment of the present invention may control the UE transmitter (100*a*), so that the UE transmitter (100*a*) can modulate Y-bit ACK/NACK information, which indicates that a specific CC corresponds to ACK and that all of the remaining CC(s) correspond to NACK(s), to a first complex-valued modulation symbol, and so that the UE transmitter (100*a*) can modulate Y-bit ACK/NACK information, which indicates that all of the CCs including the specific CC correspond to NACKs, to a second complex-valued modulation symbol. When Y is greater than 1, the UE processor (400*a*) according to the third embodiment of the present invention may control the UE transmitter (100*a*), so that the UE transmitter (100*a*) can modulate 2-bit ACK/NACK information, which consists of 1-bit indicating that a specific CC corresponds to an ACK and 1-bit indicating that at least one or more of the remaining CCs correspond to a NACK, to the first complex-valued modulation symbol. And, the UE processor (400*a*) according to the third embodiment of the present invention may control the UE transmitter (100*a*), so that the UE transmitter (100*a*) can modulate 2-bit ACK/NACK information, which consists of 1-bit indicating that the specific CC corresponds to an NACK and 1-bit indicating that at least one or more of the remaining CCs correspond to a NACK, to the second complex-valued modulation symbol. The UE processor (400*a*) may map the remaining ACK/NACK states to the 4 constellation points, respectively, in accordance with a pre-defined ACK/NACK state-to-complex-valued modulation symbol mapping relation. Depending upon the ACK/NACK state-to-complex-valued modulation symbol mapping relation, which is defined in accordance with any one of the first embodiment to the third embodiment of the present invention, the UE processor (400*a*) may control the modulation mapper (302) so that the ACK/NACK information can be mapped to a constellation point within a signal constellation.

The UE processor (400*a*) may control the UE transmitter (100*a*), so that the UE transmitter (100*a*) can use an SR PUCCH resource in order to transmit the ACK/NACK information (S1460), which is modulated to a complex-valued modulation symbol in accordance with any one of the first embodiment to the third embodiment of the present invention. Based upon the control of the UE processor (400*a*), a resource element mapper (305) of the UE transmitter (100*a*) may map the complex-valued modulation symbol of the ACK/NACK information to an SR PUCCH resource. The UE transmitter (100*a*) may transmit the complex-valued modulation symbol of the ACK/NACK information over the SR PUCCH.

When a BS receiver (300*b*) receives a signal over an SR PUCCH (S1460), which has been reserved for the UE, the processor (400*b*) of the BS, which is configured according to the exemplary embodiment of the present invention, may determine that the UE has transmitted an uplink scheduling request. Additionally, when the BS receiver (300*b*) receives a first complex-valued modulation symbol over the SR PUCCH, the BS processor (400*b*) may determine that the DL data, which are transmitted to the UE over at least one specific CC, have been successfully received by the UE. And, when the BS receiver (300*b*) receives a second complex-valued modulation symbol over the SR PUCCH, the BS processor (400*b*) may determine that the DL data, which are transmitted to the UE over at least one specific CC, have not been successfully received by the UE.

In order to change the CC that is available to the UE, the BS processor (400*b*) may control the BS transmitter (100*b*), so that the BS transmitter (100*b*) can generate an RRC control message or an L1/L2 control message and to transmit the generated message. Due to a mismatch (or discrepancy) in a time point, at which the BS changes the CC configuration, and a time point, at which the UE changes the CC, in order to prevent a DL data transmission error and/or a UL ACK/NACK transmission error from occurring, the BS processor (400*b*) may first transmit the message and may, then, schedule DL data only in the specific CC during a predetermined time period. When the UE is connected to the BS in a TDD mode, the BS processor (400*b*) may schedule DL data only in a specific subframe of the specific CC. In this case, regardless of the number of DL CCs, which are actually configured for the UE, the BS transmitter may transmit the DL CC only through the specific CC during the predetermined time period. According to the embodiments of the present invention, regardless of the number of CCs, which are configured for the CC, the UE processor (400*a*) controls the UE transmitter (100*a*), so that the UE transmitter (100*a*) can transmit the first complex-valued modulation symbol when the specific CC corresponds to an ACK and when all of the remaining CCs correspond to NACKs, and so that the UE transmitter (100a) can transmit the second complex-valued modulation symbol when the specific CC corresponds to an NACK and when all of the remaining CCs correspond to NACKs. Therefore, the UE may transmit accurate ACK/NACK to the BS with respect to the specific CC.

Although the above-described first embodiment to the above-described third embodiment of the present invention describe exemplary cases when Y is equal to 1, or, 2, 3, the present invention may also be applied to other numbers of DL CCs. Additionally, the first embodiment to the third embodiment of the present invention may also be applied to a case when the ACK/NACK information is modulated by a modulation scheme of a higher degree than the BPSK or QPSK. More specifically, as long as the ACK for the specific CC and the NACK or bundled NACK for each of the remaining CCs are modulated to the same complex-valued modulation symbol as the 1-bit ACK when Y=1, and as long as the NACK or bundled NACK for all of the CCs including the specific CC are modulated to the same complex-valued modulation symbol as the 1-bit NACK when Y=1, any embodiment may correspond to the present invention.

According to the embodiments of the present invention, regardless of the number of DL CCs, the present invention is advantageous in that the ACK/NACK for at least a specific CC can be accurately transmitted from the UE to the BS. According to the embodiments of the present invention, although there still remains the possibility of transmission error occurring, when transmitting the ACK/NACK for the remaining CC(s), an accurate ACK/NACK transmission is provided for the specific CC. Any ACK/NACK transmission error for any of the remaining CCs, other than the specific CC, may be prevented by having the BS transmit DL data only through the specific CC during a predetermined time period after the BS reconfigures the CC or changes the CC.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

What is claimed is:

1. A method of transmitting, by a user equipment, uplink control information in a wireless communication system, the method comprising:
    determining, by the user equipment, an acknowledgement (ACK)/negative ACK (NACK) for each of a plurality of carriers configured for the user equipment;
    generating, by the user equipment, ACK/NACK information for the plurality of carriers based on the determined ACK/NACKs for the plurality of carriers;
    modulating, by the user equipment, the ACK/NACK information into a modulation symbol '1', 'j', '−1' or 'j'; and
    transmitting, by the user equipment, the modulation symbol by using a physical uplink control channel (PUCCH) resource reserved for a scheduling request of the user equipment,
    wherein the ACK/NACK information is modulated into a first modulation symbol '1' when ACK/NACK for a specific carrier among the plurality of carriers is determined to be ACK and ACK/NACK for the remaining carriers other than the specific carrier is determined to be NACK, and the ACK/NACK information is modulated into a second modulation symbol '−1' when the ACK/NACK for the specific carrier is determined to be NACK and the ACK/NACK for the remaining carriers other than the specific carrier is determined to be NACK.

2. The method of claim 1, wherein the NACK for the remaining carriers indicates that ACK/NACK for at least one of the remaining carriers is NACK.

3. The method of claim 1, wherein the specific carrier is a primary carrier among the plurality of carriers.

4. The method of claim 1, wherein the NACK for the remaining carriers indicates that respective ACK/NACKs for the remaining carriers are determined to be NACK.

5. A user equipment of transmitting uplink control information in a wireless communication system, the user equipment comprising:
    a processor configured to determine an acknowledgement (ACK)/negative ACK (NACK) for each of a plurality of carriers configured for the user equipment, generate ACK/NACK information for the plurality of carriers based on the determined ACK/NACKs for the plurality of carriers, and modulate the ACK/NACK information into a modulation symbol '1', 'j', '−1' or '−j'; and
    a transmitter configured to transmit the modulation symbol to the base station by using a physical uplink control channel (PUCCH) resource reserved for a scheduling request of the user equipment,
    wherein the ACK/NACK information is modulated into a first modulation symbol '1' when ACK/NACK for a specific carrier among the plurality of carriers is determined to be ACK and ACK/NACK for the remaining carriers other than the specific carrier is determined to be NACK, and the ACK/NACK information is modulated into a second modulation symbol '−1' when the ACK/NACK for the specific carrier is determined to be NACK and the ACK/NACK for the remaining carriers other than the specific carrier is determined to be NACK.

6. The user equipment of claim 5, wherein the NACK for the remaining carriers indicates that ACK/NACK for at least one of the remaining carriers is NACK.

7. The user equipment of claim 5, wherein the specific carrier is a primary carrier among the plurality of carriers.

8. The user equipment of claim 5, wherein the NACK for the remaining carriers indicates that respective ACK/NACKs for the remaining carriers are determined to be NACK.

* * * * *